(12) United States Patent
Li et al.

(10) Patent No.: US 11,641,666 B2
(45) Date of Patent: May 2, 2023

(54) UPLINK TRANSMISSION METHOD AND DEVICE

(71) Applicant: VIVO MOBILE COMMUNICATION CO., LTD., Guangdong (CN)

(72) Inventors: Na Li, Guangdong (CN); Xiaodong Shen, Guangdong (CN); Xueming Pan, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 103 days.

(21) Appl. No.: 16/969,257

(22) PCT Filed: Feb. 2, 2019

(86) PCT No.: PCT/CN2019/074563
§ 371 (c)(1),
(2) Date: Aug. 12, 2020

(87) PCT Pub. No.: WO2019/154357
PCT Pub. Date: Aug. 15, 2019

(65) Prior Publication Data
US 2021/0007119 A1 Jan. 7, 2021

(30) Foreign Application Priority Data
Feb. 12, 2018 (CN) .......................... 201810147360.2

(51) Int. Cl.
*H04W 72/12* (2023.01)
*H04W 72/04* (2023.01)
(Continued)

(52) U.S. Cl.
CPC ... *H04W 72/1242* (2013.01); *H04W 72/0413* (2013.01); *H04W 72/0446* (2013.01); *H04W 72/10* (2013.01); *H04W 74/0816* (2013.01)

(58) Field of Classification Search
CPC ......... H04W 72/1242; H04W 72/0413; H04W 72/0446; H04W 72/10; H04W 74/0816;
(Continued)

(56) References Cited

U.S. PATENT DOCUMENTS

2009/0232095 A1 9/2009 Ahn et al.
2015/0189641 A1 7/2015 Uchino et al.
(Continued)

FOREIGN PATENT DOCUMENTS

CN 103188818 A 7/2013
CN 104641577 A 5/2015
(Continued)

OTHER PUBLICATIONS

CATT, Multiplexing of UCI transmissions of different durations or configurations[online], 3GPP Tsg Ran WG1 adhoc_NR_AH_1801, 3GPP, 2028/01/26, R1-1800252, search date [Sep. 17, 2021], Internet.

(Continued)

*Primary Examiner* — Chi H Pham
*Assistant Examiner* — Raul Rivas
(74) *Attorney, Agent, or Firm* — Brooks Kushman P.C.

(57) ABSTRACT

An uplink transmission method and a device are provided. The method includes: determining, in a case that transmissions of at least two uplink channels conflict in a time domain, priorities of the at least two uplink channels according to at least one of a transmission-related time duration, a transmission start time or carried information; and performing uplink transmission according to the priorities of the at least two uplink channels.

20 Claims, 6 Drawing Sheets

(51) Int. Cl.
   *H04W 72/0446*   (2023.01)
   *H04W 72/10*   (2009.01)
   *H04W 74/08*   (2009.01)

(58) Field of Classification Search
   CPC . H04W 88/02; H04W 72/12; H04W 72/1268; H04W 72/1284
   See application file for complete search history.

(56) References Cited

U.S. PATENT DOCUMENTS

| | | | |
|---|---|---|---|
| 2015/0208402 A1 | 7/2015 | Hwang et al. | |
| 2016/0337839 A1 | 11/2016 | Chae et al. | |
| 2017/0111891 A1 | 4/2017 | He et al. | |
| 2017/0332386 A1* | 11/2017 | Li | H04W 72/0446 |
| 2018/0279291 A1* | 9/2018 | Tiirola | H04W 72/0413 |
| 2019/0141642 A1 | 5/2019 | Liu et al. | |

FOREIGN PATENT DOCUMENTS

| | | |
|---|---|---|
| CN | 105940742 A | 9/2016 |
| CN | 107396394 A | 11/2017 |
| CN | 107567098 A | 1/2018 |
| EP | 2 816 853 A1 | 12/2014 |
| WO | 2013028113 A1 | 2/2013 |
| WO | 2016000241 A1 | 1/2016 |
| WO | 2017/171615 A1 | 10/2017 |

OTHER PUBLICATIONS

Japanese Office Action dated Sep. 17, 2021, issued in JP2020565000.
LG Electronics, Remaining issues on collision handling between different TTI lengths[online], 3GPP TSG RAN WG1 #91, 3GPP, Dec. 1, 2017, R1-1719855, search date [Sep. 17, 2021], Internet.
Second Office Action dated Sep. 27, 2020 issued in Chinese Application No. 201810147360.2.
3GPP TSG RAN WG1 NR Meeting AH 1801, R1-1800995, Canada, Vancouver, Jan. 22-26, 2018, (revision of R1-1800202), "Remaining issues on UCI multiplexing", 24 pages.
Extended European Search Report dated Jan. 21, 2021 issued in PCT/CN2019/074563.
3GPP TSG-RAN WG2 Meeting #99bis, R2-1710960, Prague, Czech Republic, Oct. 9-13, 2017, (Resubmission of R2-1708488), "Collision between grant-based and grant-free resources on the same UL carrier", 3 pages.
Written Opinion/International Search Report dated Aug. 27, 2020 issued in PCT/CN2019/074563.
3GPP TSG-RAN WG1 Meeting #90, R1-1712893, Prague, Czech Republic, Aug. 21-25, 2017, "Handling collisions of sTTI and TTI in UL", 8 pages.
Search Report dated Mar. 25, 2020, issued in Chinese Application No. 201810147360.2.
First Office Action for Korean Application No. 10-2020-7025632, dated Apr. 25, 2022, 5 Pages.
Asustek, "Multiplexing of UL eMBB and URLLC in NR," 3GPP TSG RAN WG1 Meeting AH 1801, Jan. 22-26, 2018, R1-1800218, Item 7.3.3.6, Vancouver, Canada, 3 Pages.
Samsung, "Summary of NR UL Power Control—CA Aspects," 3GPP TSG RAN WG1 Meeting AH 1801, Jan. 22-26, 2018, R1-18001025, Item 7.6.2, Vancouver, Canada, 4 Pages.
Communication Pursuant to Article 94(3) EPC for European Application No. 19750323.8-1215, dated Sep. 2, 2022, 7 Pages.
Decision of Refusal for Korean Application No. 10-2020-7025632, dated Nov. 30, 2022, 4 Pages.
Qualcomm Incorporated, "Remaining Issues for Long PUCCH," 3GPP TSG RAN WG1 Meeting AH 1801, Agenda item 7.3.2.2, Jan. 22-23, 2018, R1-1800872, Vancouver, Canada, 7 Pages.

* cited by examiner

UPLINK TRANSMISSION METHOD AND DEVICE

CROSS-REFERENCE TO RELATED APPLICATION

"This application is the U.S. national phase of PCT Application No. PCT/CN2019/074563 filed on Feb. 2, 2019, which claims a priority to Chinese Patent Application No. 201810147360.2 filed on Feb. 12, 2018, the disclosure of which are incorporated in their entireties by reference herein."

TECHNICAL FIELD

The present disclosure relates to the field of communications, in particular to an uplink transmission method and a device.

BACKGROUND

The future mobile communication systems need to adapt to more diversified scenarios and service requirements. The main scenarios of a new radio (New Radio, NR) system include: enhanced mobile broadband (Enhanced Mobile Broadband, eMBB), ultra reliable and low latency communication (Ultra Reliable & Low Latency Communication, URLLC), and massive machine type of communication (massive Machine Type of Communication, mMTC). These scenarios have different requirements on the NR system in terms of high reliability, low latency, large bandwidth, and wide coverage.

In the NR system, since a physical uplink control channel (Physical Uplink Control Channel, PUCCH) or a physical uplink shared channel (Physical Uplink Shared Channel, PUSCH) can be configured with different transmission start times and different time durations, there may exist a case where two or more than two uplink channels are transmitted simultaneously in a certain slot (transmissions of the uplink channels overlap or partially overlap in a time domain). In this case, transmissions of multiple uplink channels conflict in the time domain, and the terminal device cannot determine how to perform uplink channel transmission.

SUMMARY

Some embodiments of the present disclosure are to provide an uplink transmission method and a device, to avoid a problem of ambiguous behavior of a terminal device in a case that transmissions of at least two uplink channels conflict in a time domain.

In a first aspect, an uplink transmission method is provided, and the method includes:

determining, in a case that transmissions of at least two uplink channels conflict in a time domain, priorities of the at least two uplink channels according to at least one of a transmission-related time duration, a transmission start time or carried information; and performing uplink transmission according to the priorities of the at least two uplink channels.

In a second aspect, a terminal device is provided, and the terminal device includes:

a determination unit, configured to determine, in a case that transmissions of at least two uplink channels conflict in a time domain, priorities of the at least two uplink channels according to at least one of a transmission-related time duration, a transmission start time or carried information; and a transmission unit, configured to perform uplink transmission according to the priorities of the at least two uplink channels.

In a third aspect, a terminal device is provided. The terminal device includes a processor, a memory, and a computer program stored on the memory and executable on the processor. When executing the computer program, the processor is configured to implement steps in the method described in the first aspect.

In a fourth aspect, a computer-readable storage medium is provided. A computer program is stored on the computer-readable storage medium, and when the computer program is executed by a processor, the processor is configured to implement steps in the method described in the first aspect.

In some embodiments of the present disclosure, in a case that transmissions of at least two uplink channels conflict in a time domain, a terminal device determines priorities of the at least two uplink channels based on at least one of a transmission-related time duration, a transmission start time or carried information; and performs uplink transmission based on the determined priorities, which can avoid a problem of ambiguous behavior of the terminal device in a case that transmissions of at least two uplink channels conflict in a time domain, thereby improving the effectiveness of communications.

BRIEF DESCRIPTION OF THE DRAWINGS

The drawings described herein are used to provide a further understanding of the present disclosure and constitute a part of the present disclosure. The exemplary embodiments of the present disclosure and descriptions thereof are used to explain the present disclosure, and do not constitute any improper limitation of the present disclosure. In the drawings.

DETAILED DESCRIPTION

A technical solution in some embodiments of the present disclosure will be clearly and completely described below in conjunction with the drawings in some embodiments of the present disclosure. Obviously, the described embodiments are part of the embodiments of the present disclosure, rather than all of the embodiments. Based on the embodiments in the present disclosure, all other embodiments obtained by those of ordinary skill in the art without creative effort shall fall within the protection scope of the present disclosure.

It should be understood that the technical solution according to some embodiments of the present disclosure may be applied to a 5G system, which is also referred to as a new radio system.

Terminal device, which may also be referred to as mobile terminal (Mobile Terminal), mobile user equipment, etc., can communicate with one or more core networks via a radio access network (Radio Access Network, RAN). The terminal device may include but not limited to mobile station (Mobile Station, MS), mobile terminal (Mobile Terminal), mobile telephone (Mobile Telephone), user equipment (User Equipment, UE), cellphone (handset), portable equipment (Portable Equipment), and vehicle (Vehicle), etc. The terminal device can communicate with one or more core networks via a radio access network (Radio Access Network, RAN). For example, the terminal device may be a mobile phone (or referred to as a "cellular" phone) or a computer with a wireless communication function, etc. The terminal device may also be portable, pocket-sized, handheld or built-in computer, or vehicle-mounted mobile device.

Network device is a device deployed in a wireless access network to provide wireless communication functions for terminal devices. The network device may be a base station, and the base station may include various forms of macro base station, micro base station, relay station or access point. A device with a base station function may have different names in systems using different wireless access technologies. For example, in an LTE network, the network device is referred to as an evolved Node B (evolved NodeB, eNB or eNodeB), in the $3^{rd}$ generation ($3^{rd}$ Generation, 3G) network, it is referred to as a Node B, and in a $5^{th}$ generation network, it is referred to as gNB.

The technical solutions provided by various embodiments of the present disclosure will be described in detail below with reference to the accompanying drawings.

Figure 1:
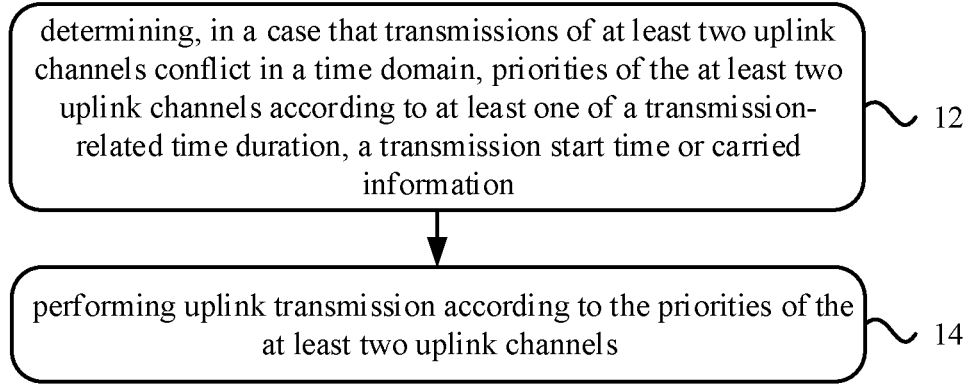
FIG. 1 is a schematic flowchart of an uplink transmission method provided by some embodiments of the present disclosure.

FIG. 1 is a schematic flowchart of an uplink transmission method provided by some embodiments of the present disclosure. Referring to FIG. 1, the method may specifically include the following steps 12 to 14.

Step 12 includes: determining, in a case that transmissions of at least two uplink channels conflict in a time domain, priorities of the at least two uplink channels according to at least one of a transmission-related time duration, a transmission start time or carried information.

Optionally, as an example, the transmission-related time duration includes at least one of a time duration occupied by each of the at least two uplink channels, or a transmission periodicity of information carried on each of the at least two uplink channels.

For example, in a case that the information carried by the uplink channel is service data (Data), hybrid automatic repeat request-acknowledgement (Hybrid Automatic Repeat Request-Acknowledgement, HARQ-ACK) information, or channel state information (Channel State Information, CSI), the transmission-related time duration includes the time duration occupied by the uplink channel. The time duration occupied by the uplink channel may be represented by the number of time-domain symbols occupied by the uplink channel, or determined by the product of the number of time-domain symbols occupied by the uplink channel and the duration of a symbol. In a case that the information carried by the uplink channel is periodic information (for example, scheduling request (Scheduling Request, SR) and grant free service information), the transmission-related time duration of the uplink channel includes the transmission periodicity of the information. The transmission periodicity of the information carried on the uplink channel may be represented by the number of time-domain symbols included by the transmission periodicity, or determined by the product of the number of time-domain symbols included by the transmission periodicity and the duration of a symbol.

Optionally, a first implementation manner of step 12 may include: determining the priorities of the at least two uplink channels according to one of following rules:

an uplink channel with the shorter transmission-related time duration having a higher priority;

in uplink channels with the same transmission-related time duration, an uplink channel whose carried information has a higher priority having a higher priority;

in uplink channels with the same transmission-related time duration, an uplink channel with the earlier transmission start time having a higher priority;

in uplink channels with the same transmission-related time duration and with carried information having a same priority, an uplink channel with the earlier transmission start time having a higher priority; or in uplink channels with the same transmission-related time duration and with the same transmission start time, an uplink channel whose carried information has a higher priority having a higher priority.

Taking the at least two uplink channels including a first uplink channel and a second uplink channel as an example, priorities of the two uplink channels are determined according to one of the following rules:

in a case that the transmission-related time duration of the first uplink channel is less than the transmission-related time duration of the second uplink channel, determining that the priority of the first uplink channel is higher than the priority of the second uplink channel; and in a case that the transmission-related time duration of the first uplink channel is larger than the transmission-related time duration of the second uplink channel, determining that the priority of the first uplink channel is lower than the priority of the second uplink channel;

in a case that transmission-related time durations of the first uplink channel and the second uplink channel are the same, if the priority corresponding to the information carried by the first uplink channel is higher than the priority corresponding to the information carried by the second uplink channel, determining that the priority of the first uplink channel is higher than the priority of the second uplink channel; and if the priority corresponding to the information carried by the first uplink channel is lower than the priority corresponding to the information carried by the second uplink channel, determining that the priority of the first uplink channel is lower than that of the second uplink channel;

in a case that transmission-related time durations of the first uplink channel and the second uplink channel are the same, if the transmission start time of the first uplink channel is earlier than the transmission start time of the second uplink channel, determining that the priority of the first uplink channel is higher than the priority of the second uplink channel; and if the transmission start time of the first uplink channel is later than the transmission start time of the second uplink channel, determining that the priority of the first uplink channel is lower than the priority of the second uplink channel;

in a case that transmission-related time durations of the first uplink channel and the second uplink channel are the same, and priorities corresponding to information carried on the first uplink channel and the second uplink channel are the same, if the transmission start time of the first uplink channel is earlier than the transmission start time of the second uplink channel, determining that the priority of the first uplink channel is higher than the priority of the second uplink channel; and if the transmission start time of the first uplink channel is later than the transmission start time of the second uplink channel, determining that the priority of the first uplink channel is lower than that of the second uplink channel; and in a case that transmission-related time durations of the first uplink channel and the second uplink channel are the same, and priorities corresponding to information carried on the first uplink channel and the second uplink channel are the same, if the priority corresponding to the information carried by the first uplink channel is higher than the priority corresponding to the information carried by the second uplink channel, determining that the priority of the first uplink channel is higher than the priority of the second uplink channel; and if the priority corresponding to the information carried by the first uplink channel is lower than the priority corresponding to the information carried by the second uplink channel, determining that the priority of the first uplink channel is lower than the priority of the second uplink channel.

Figure 2:
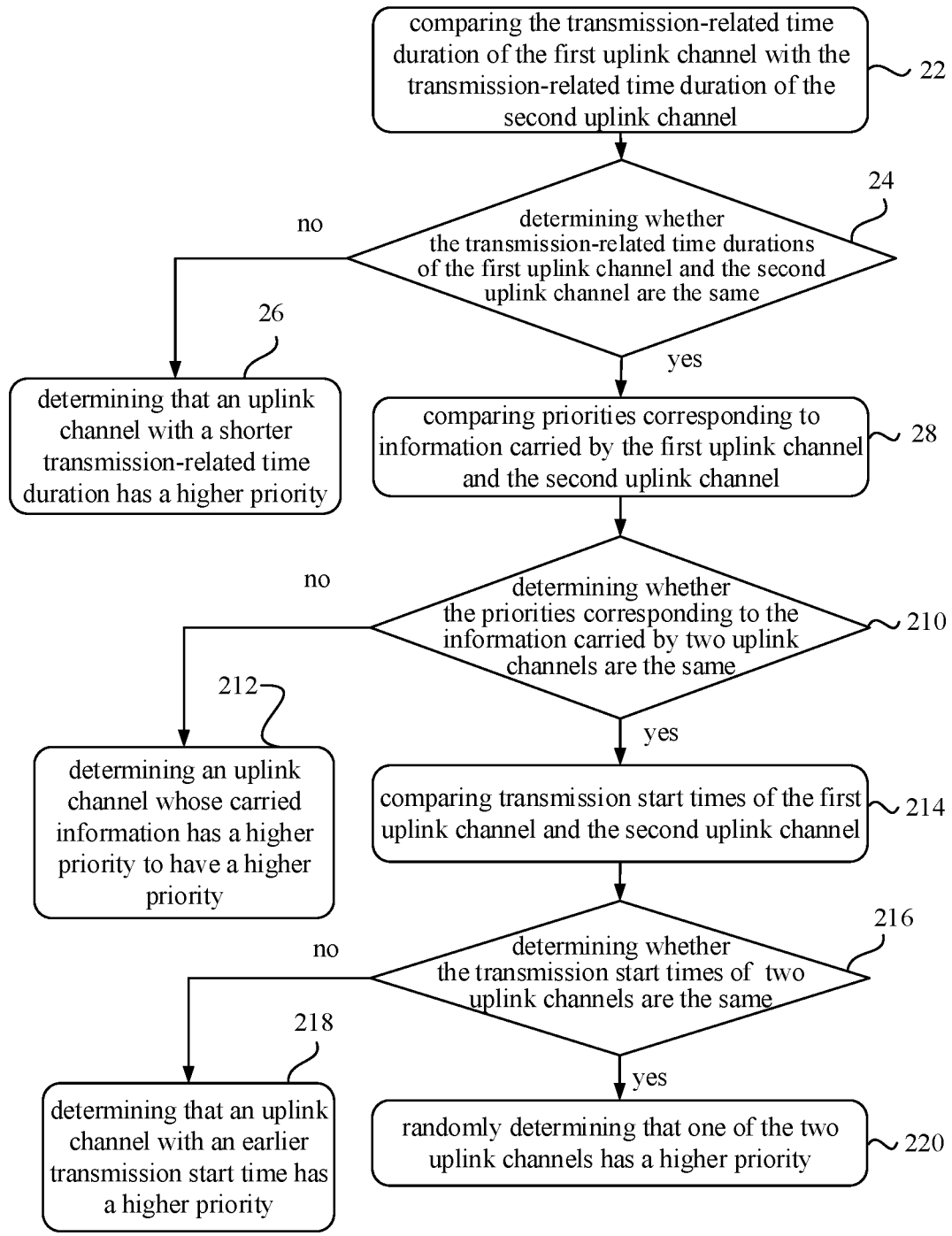
FIG. 2 is a schematic flowchart of a first implementation manner of a step of determining a priority of an uplink channel provided by some embodiments of the present disclosure.

As an example, with reference to FIG. 2, the first implementation manner may include the following steps:

step 22, comparing the transmission-related time duration of the first uplink channel with the transmission-related time duration of the second uplink channel;

step 24, determining whether the transmission-related time durations of the first uplink channel and the second uplink channel are the same; if not, going to step 26; and if yes, going to step 28; and step 26, determining that an uplink channel with a shorter transmission-related time duration has a higher priority.

Optionally, as an example, it is assumed that each of the information carried by the first uplink channel and the information carried by the second uplink channel is one of Data, HARQ-ACK information, and CSI, specific implementation manners of step 22 to step 26 may include the following methods:

a first method: comparing the number of time-domain symbols occupied by the first uplink channel with the number of time-domain symbols occupied by the second uplink channel, if the former is less than the latter, determining that the transmission-related time duration of the first uplink channel is less than the transmission-related time duration of the second uplink channel, and then determining that the priority of the first uplink channel is higher than that of the second uplink channel; conversely, if the former is greater than the latter, determining that the transmission-related time duration of the first uplink channel is greater than the transmission-related time duration of the second uplink channel, and then determining that the priority of the first uplink channel is lower than the priority of the second uplink channel; and if the former is equal to the latter, determining that the transmission-related time durations of the first uplink channel and the second uplink channel are the same, and then determining that the priorities of the first uplink channel and the second uplink channel are the same; or a second method: comparing the product of the number of time-domain symbols occupied by the first uplink channel and the duration of a symbol with the product of the number of time-domain symbols occupied by the second uplink channel and the duration of a symbol; if the former is smaller than the latter, determining that the transmission-related time duration of the first uplink channel is smaller than the transmission-related time duration of the second uplink channel, and determining that the priority of the first uplink channel is higher than the priority of the second uplink channel; conversely, if the former is greater than the latter, determining that the transmission-related time duration of the first uplink channel is greater than the transmission-related time duration of the second uplink channel, and then determining that the priority of the first uplink channel is lower than the priority of the second uplink channel; and if the former is equal to the latter, determining that the transmission-related time durations of the first uplink channel and the second uplink channel are the same, and then determining that the priorities of the first uplink channel and the second uplink channel are the same; or a third method: comparing the number of symbols occupied by the first uplink channel and the number of symbols occupied by the second uplink channel, respectively with a predetermined symbol number threshold (for example, 3 symbols); in a case that the number of time-domain symbols occupied by the first uplink channel is less than the symbol number threshold, determining that the transmission-related time duration of the first uplink channel belongs to a category of short transmission time, in a case that the number of time-domain symbols occupied by the second uplink channel is greater than the symbol number threshold, determining that the transmission-related time duration of the second uplink channel belongs to a category of long transmission time, and determining that the priority of the first uplink channel is higher than the second uplink channel, based on a predetermined rule (a priority of an uplink channel corresponding to the short transmission time is higher than a priority of an uplink channel corresponding to the long transmission time); and in a case that both the transmission-related time durations of the first uplink channel and the second uplink channel belong to a category of short transmission time or a category of long transmission time, determining that the priorities of the first uplink channel and the second uplink channel are the same, or, further performing the first method and the second method.

Optionally, as another example, it is assumed that the information carried by the first uplink channel and the information carried by the second uplink channel are periodic information (for example, SR, or grant free service information), specific implementation manners of step 22 to step 26 may include the following methods:

a fourth method: comparing the number of time-domain symbols included in a transmission periodicity of the information carried on the first uplink channel with the number of time-domain symbols included in a transmission periodicity of the information carried on the second uplink channel; if the former is less than the latter, determining that the transmission-related time duration of the first uplink channel is less than the transmission-related time duration of the second uplink channel, and further determining that the priority of the first uplink channel is higher than the priority of the second uplink channel; conversely, if the former is greater than the latter, determining that the transmission-related time duration of the first uplink channel is greater than the transmission-related time duration of the second uplink channel, and then determining that the priority of the first uplink channel is lower than the priority of the second uplink channel; and if the former is equal to the latter, determining that the transmission-related time durations of the first uplink channel and the second uplink channel are the same, and then determining that the priorities of the first uplink channel and the second uplink channel are the same; or a fifth method: comparing the product of the number of time-domain symbols included in a transmission periodicity of the information carried on the first uplink channel and the duration of a symbol, with the product of the number of time-domain symbols included in a transmission periodicity of the information carried on the second uplink channel and the duration of a symbol; if the former is less than the latter, determining that the transmission-related time duration of the first uplink channel is less than the transmission-related time duration of the second uplink channel, and then determining that the priority of the first uplink channel is higher than the priority of the second uplink channel; conversely, if the former is larger than the latter, determining that the transmission-related time duration of the first uplink channel is greater than the transmission-related time duration of the second uplink channel, and then determining that the priority of the first uplink channel is lower than the priority of the second uplink channel; and if the former is equal to the latter, determining that the transmission-related time durations of the first uplink channel and the second uplink channel are the same, and then determining that the priorities of the first uplink channel and the second uplink channel are the same; or a sixth method: comparing the number of time-domain symbols included in a transmission periodicity of the information carried on the first uplink channel and the number of time-domain symbols included in the second uplink channel, respectively with a predetermined symbol number threshold (for example, 3 symbols); if the number of time-domain symbols included in the transmission periodicity of the information carried on the first uplink channel is less than the symbol number threshold, determining that the transmission-related time duration of the first uplink channel belongs to a category of short transmission time, if the number of time-domain symbols included in the transmission periodicity of the information carried on the second uplink channel is greater than the symbol number threshold, determining that the transmission-related time duration of the second uplink channel belongs to a category of long transmission time, and determining that the priority of the first uplink channel is higher than the priority of the second uplink channel, based on a predetermined rule (a priority of an uplink channel corresponding to the short transmission time is higher than a priority of an uplink channel corresponding to the long transmission time); and if both the transmission-related time durations of the first uplink channel and the second uplink channel belong to a category of short transmission time or a category of long transmission time, determining that the priorities of the first uplink channel and the second uplink channel are the same, or, further performing the fourth method and the fifth method.

Optionally, as another example, it is assumed that the information carried by the first uplink channel is any one of Data, HARQ-ACK information or CSI, and the information carried by the second uplink channel is periodic information (for example, SR, or grant free service information), specific implementation manners of step 22 to step 26 may include the following methods:

a seventh method: comparing the number of time-domain symbols occupied by the first uplink channel with the number of time-domain symbols included in a transmission periodicity of the information carried on the second uplink channel, determining the relative size between the transmission-related time durations of the first uplink channel and the second uplink channel based on the comparison result, and further determining the priority of the first uplink channel and the priority of the second uplink channel; or an eight method: comparing the product of the number of time-domain symbols occupied by the first uplink channel and the duration of a symbol, with the product of the number of time-domain symbols included in a transmission periodicity of the information carried on the second uplink channel and the duration of a symbol, determining the relative size between the transmission-related time durations of the first uplink channel and the second uplink channel based on the comparison result, and further determining the priority of the first uplink channel and the priority of the second uplink channel; or a ninth method: comparing the number of symbols occupied by the first uplink channel and the number of time-domain symbols included in a transmission periodicity of the information carried on the second uplink channel, respectively with a predetermined symbol number threshold (for example, 3 symbols), determining categories to which the transmission-related time durations of the first uplink channel and the second uplink channel belongs, based on the comparison result, and further determining the priority of the first uplink channel and the priority of the second uplink channel.

For a third example, it can be understand that, since the first example and the second example have described a case where "the information carried by the first uplink channel and the information carried by the second uplink channel are Data, HARQ-ACK information, and CSJ", and a case where "the information carried by the first uplink channel and the information carried by the second uplink channel are periodic information", the third example will be briefly described herein. For similarities, reference can be made to the related descriptions in the first example and the second example.

Step 28 includes: comparing priorities corresponding to information carried by the first uplink channel and the second uplink channel.

Step 210 includes: determining whether the priorities corresponding to the information carried by the first uplink channel and the second uplink channel are the same; if not, going to step 212; and if yes, going to step 214.

Step 212 includes: determining an uplink channel whose carried information has a higher priority to have a higher priority.

For example, the first uplink channel carries uplink control information (Uplink Control Information, UCI), the second uplink channel carries service data (Data), and it can be determined that the priority of the first uplink channel is higher than the priority of the second uplink channel. For the relevant rules of the priority corresponding to the carried information, please refer to the subsequent descriptions.

Step 214 includes: comparing transmission start times of the first uplink channel and the second uplink channel.

Step 216 includes: determining whether the transmission start times of the first uplink channel and the second uplink channel are the same; if not, going to step 218; and if yes, going to step 220.

Step 218 includes: determining that an uplink channel with an earlier transmission start time has a higher priority.

Examples are as follows: with reference to FIG. 3a, in a case that transmission start times of the first uplink channel 11 and the second uplink channel 12 are the same, it may be considered that the priorities of the two uplink channels are the same; with reference to FIG. 3b, in a case that the transmission start time of the first uplink channel 11 is later than the transmission start time of the second uplink channel 12, it may be considered that the second uplink channel 12 has a higher priority; and with reference to FIG. 3c, in a case that the transmission start time of the first uplink channel 11 is earlier than the transmission start time of the second uplink channel 12, it may be considered that the first uplink channel 11 has a higher priority.

Step 220 includes: randomly determining that one of the two uplink channels has a higher priority.

It is not difficult to understand that in a case that the transmission-related time durations, the priorities corresponding to the carried information, and the transmission start times of the first uplink channel and the second uplink channel are the same, it may be considered that the priorities of the two uplink channels are the same, one of the two uplink channels is randomly selected based on a random algorithm, and the randomly selected uplink channel is deemed to have a higher priority.

For the first implementation manner, it should be noted that an order of the step of comparing priorities corresponding to the carried information and the step of comparing the transmission start times can be flexibly set. For example, FIG. 2 shows the order of first comparing the priorities corresponding to the carried information, and then comparing the transmission start times; or it is also possible to first compare the transmission start times and then compare the priorities corresponding to the carried information. Since steps corresponding to the latter are similar to steps corresponding to the former, the latter will not be detailed herein.

A second implementation manner of step 12 may include: determining the priorities of the at least two uplink channels according to one of following rules:

the higher a priority corresponding to information carried by an uplink channel is, the higher the priority of the uplink channel is;

among uplink channels whose carried information has a same priority, the shorter a transmission-related time duration of an uplink channel is, the higher the priority of the uplink channel is;

among uplink channels whose carried information has a same priority, the earlier a transmission start time of an uplink channel is, the higher the priority of the uplink channel is; or among uplink channels with the same transmission start time and with carried information having a same priority, the shorter a transmission-related time duration of an uplink channel is, the higher the priority of the uplink channel is.

Taking the at least two uplink channels including a first uplink channel and a second uplink channel as an example, the priorities of the two uplink channels are determined according to one of the following rules:

if the priority corresponding to the information carried by the first uplink channel is higher than the priority corresponding to the information carried by the second uplink channel, determining that the priority of the first uplink channel is higher than the priority of the second uplink channel; and if the priority corresponding to the information carried by the first uplink channel is lower than the priority corresponding to the information carried by the second uplink channel, determining that the priority of the first uplink channel is lower than the priority of the second uplink channel;

in a case that the information carried by the first uplink channel and the information carried by the second uplink channel have a same priority, if the transmission-related time duration of the first uplink channel is less than the transmission-related time duration of the second uplink channel, determining that the priority of the first uplink channel is higher than the priority of the second uplink channel; and if the transmission-related time duration of the first uplink channel is greater than the transmission-related time duration of the second uplink channel, determining that the priority of the first uplink channel is lower than the priority of the second uplink channel;

in a case that the information carried by the first uplink channel and the information carried by the second uplink channel have a same priority, if the transmission start time of the first uplink channel is earlier than the transmission start time of the second uplink channel, determining that the priority of the first uplink channel is higher than the priority of the second uplink channel; and if the transmission start time of the first uplink channel is later than the transmission start time of the second uplink channel, determining that the priority of the first uplink channel is lower than the priority of the second uplink channel; or in a case that the priorities of the carried information and the transmission start times of the first uplink channel and the second uplink channel are the same, if the transmission-related time duration of the first uplink channel is less than the transmission-related time duration of the second uplink channel, determining that that the priority of the first uplink channel is higher than the priority of the second uplink channel; and if the transmission-related time duration of the first uplink channel is greater than the transmission-related time duration of the second uplink channel, determining that the priority of the first uplink channel is lower than the priority of the second uplink channel.

Figure 4:
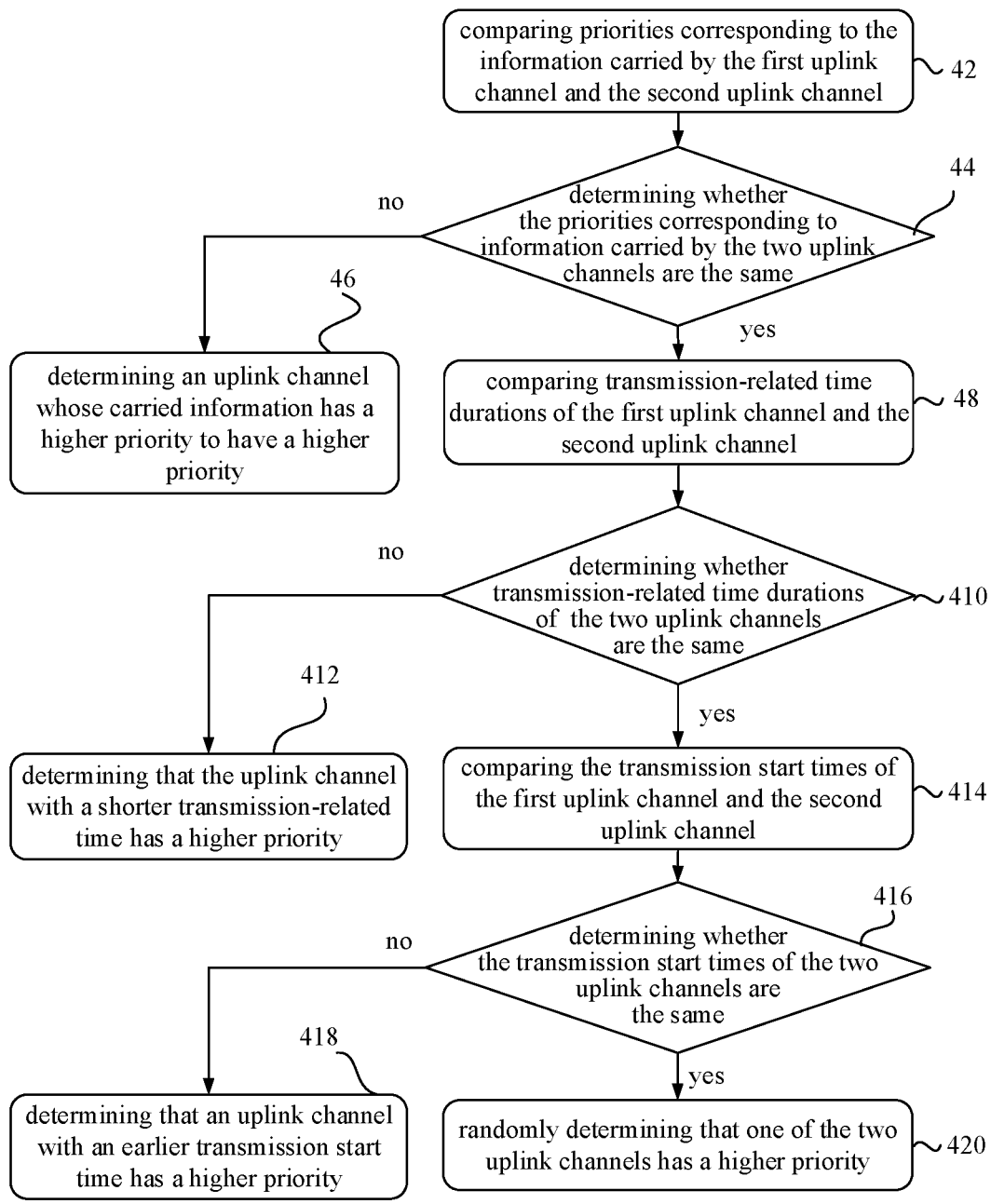
FIG. 4 is a schematic flowchart of a second implementation manner of a step of determining a priority of an uplink channel provided by some embodiments of the present disclosure.

As an example, with reference to FIG. 4, the second implementation manner may include the following steps:

step 42, comparing priorities corresponding to the information carried by the first uplink channel and the second uplink channel;

step 44, determining whether the priorities corresponding to the information carried by the first uplink channel and the second uplink channel are the same; if not, going to step 46; and if yes, going to step 48;

step 46, determining an uplink channel whose carried information has a higher priority to have a higher priority;

step 48, comparing transmission-related time durations of the first uplink channel and the second uplink channel;

step 410, determining whether transmission-related time durations of the first uplink channel and the second uplink channel are the same; if not, going to step 412; and if yes, going to step 414;

step 412, determining that the uplink channel with a shorter transmission-related time has a higher priority;

step 414, comparing the transmission start times of the first uplink channel and the second uplink channel;

step 416, determining whether the transmission start times of the first uplink channel and the second uplink channel are the same; if not, going to step 418;

and if yes, going to step 420;

step 418, determining that an uplink channel with an earlier transmission start time has a higher priority; and step 420, randomly determining that one of the two uplink channels has a higher priority.

For the second implementation manner, it should be noted that the sequence of the step of comparing the transmission-related time durations and the step of comparing the transmission start times can be flexibly set. For example, FIG. 4 shows the sequence of comparing the transmission-related time durations first, and then comparing the transmission start times; or it is also possible to compare the transmission start times first and then the transmission-related time durations. Since steps corresponding to the latter are similar to steps corresponding to the former, the latter will not be detailed herein.

A third implementation manner of step 12 may include: determining the priorities of the at least two uplink channels according to one of following rules:

an uplink channel with the earlier transmission start time has a higher priority;

among uplink channels with the same transmission start time, an uplink channel with the shorter transmission-related time duration has a higher priority; or among uplink channels with the same transmission start time, an uplink channel whose carried information has a higher priority has a higher priority.

Taking the at least two uplink channels including a first uplink channel and a second uplink channel as an example, the priorities of the two uplink channels are determined according to one of the following rules:

if the transmission start time of the first uplink channel is earlier than the transmission start time of the second uplink channel, determining that the priority of the first uplink channel is higher than the priority of the second uplink channel; and if the transmission start time of the first uplink channel is later than the transmission start time of the second uplink channel, determining that the priority of the first uplink channel is lower than the priority of the second uplink channel;

in a case that the transmission start times of the first uplink channel and the second uplink channel are the same, if the transmission-related time duration of the first uplink channel is less than the transmission-related time duration of the second uplink channel, determining that the priority of the first uplink channel is higher than the priority of the second uplink channel; and if the transmission-related time duration of the first uplink channel is larger than the transmission-related time duration of the second uplink channel, determining that the priority of the first uplink channel is lower than the priority of the second uplink channel; or in a case that the transmission start times of the first uplink channel and the second uplink channel are the same, if the priority corresponding to the information carried by the first uplink channel is higher than the priority corresponding to the information carried by the second uplink channel, determining that the priority of the first uplink channel is higher than the priority of the second uplink channel; and if the priority corresponding to the information carried by the first uplink channel is lower than the priority corresponding to the information carried by the second uplink channel, determining that the priority of the first uplink channel is lower than that of the second uplink channel.

Figure 5:
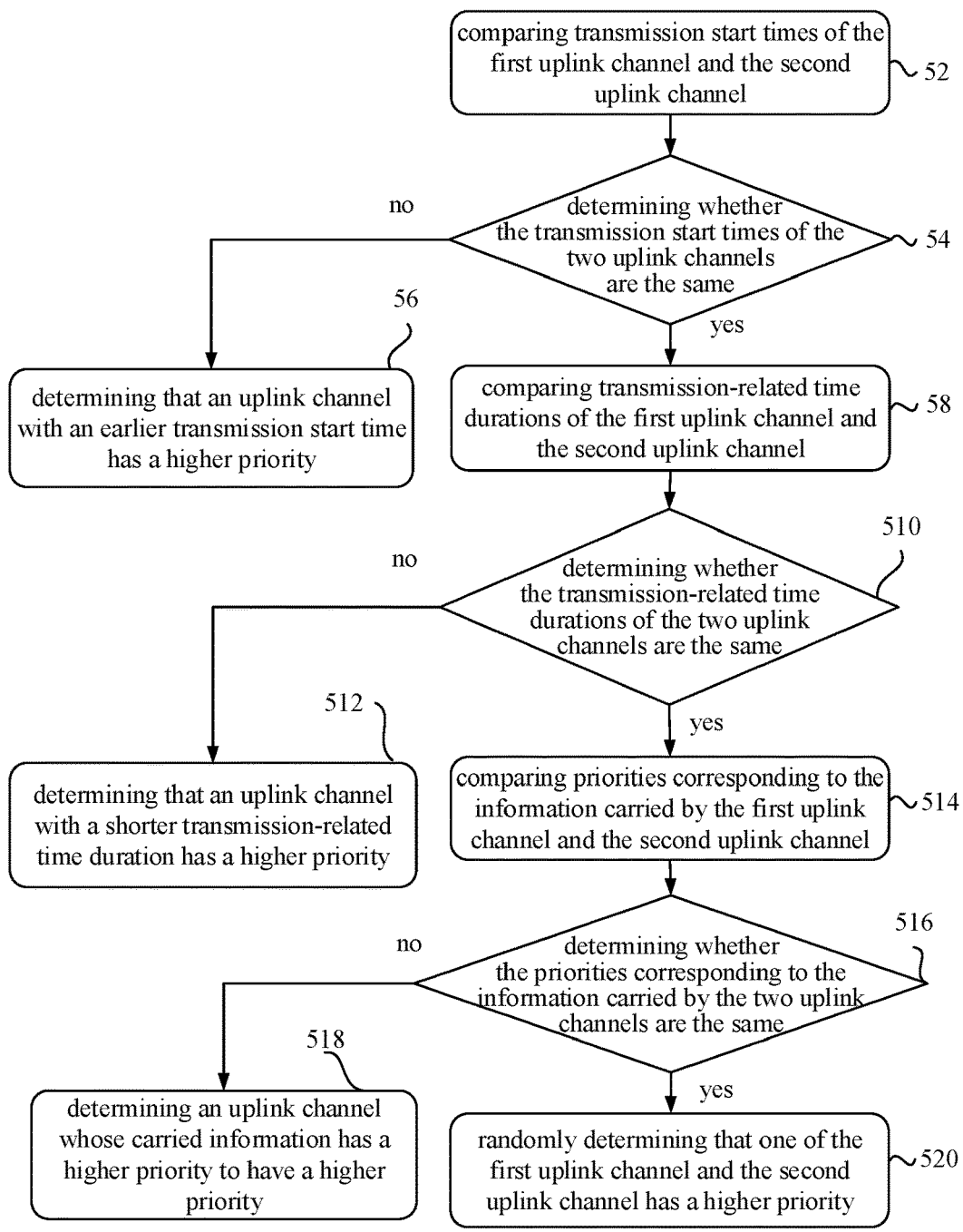
FIG. 5 is a schematic flowchart of a third implementation manner of a step of determining a priority of an uplink channel provided by some embodiments of the present disclosure.

As an example, with reference to FIG. 5, the third implementation manner may include the following steps:

step 52, comparing transmission start times of the first uplink channel and the second uplink channel;

step 54, determining whether the transmission start times of the first uplink channel and the second uplink channel are the same; if not, going to step 56; and if yes, going to step 58;

step 56, determining that an uplink channel with an earlier transmission start time has a higher priority;

step 58, comparing transmission-related time durations of the first uplink channel and the second uplink channel;

step 510, determining whether the transmission-related time durations of the first uplink channel and the second uplink channel are the same; if not, going to step 512; and if yes, going to step 514;

step 512, determining that an uplink channel with a shorter transmission-related time duration has a higher priority;

step 514, comparing priorities corresponding to the information carried by the first uplink channel and the second uplink channel;

step 516, determining whether the priorities corresponding to the information carried by the first uplink channel and the second uplink channel are the same; if not, going to step 518; and if yes, going to step 520;

step 518, determining an uplink channel whose carried information has a higher priority to have a higher priority; and step 520, randomly determining that one of the first uplink channel and the second uplink channel has a higher priority.

For the third implementation manner, it should be noted that the sequence of the step of comparing the transmission-related time durations and the step of comparing the priorities corresponding to the carried information can be flexibly set. For example, FIG. 5 shows the sequence of comparing the transmission-related time durations first, and then comparing the priorities corresponding to the carried information; or, it is also possible to compare the priorities corresponding to the carried information first, and then compare the transmission-related time durations. Since the steps corresponding to the latter are similar to those corresponding to the former, the latter will not be detailed herein.

Optionally, the "priorities corresponding to the information carried on the uplink channel" described in the three implementation manners of step 12 are determined according to a type of information carried on the uplink channel. For example, a priority corresponding to the information with the UCI type is higher than a priority corresponding to the information with the Data type; and a priority corresponding to the information with the type of HARQ-ACK or SR is higher than a priority corresponding to the information with the type of CSI.

Step 14 includes performing uplink transmission according to the priorities of the at least two uplink channels.

It should be noted that a first implementation manner of step 14 may include: transmitting a first uplink channel of the at least two uplink channels, where a priority of the first uplink channel is higher than priorities of the other uplink channels of the at least two uplink channels. That is, in a case that a conflict occurs to transmissions of at least two uplink channels in the time domain, an uplink channel with the highest priority in the at least two uplink channels is transmitted.

Figure 3A:
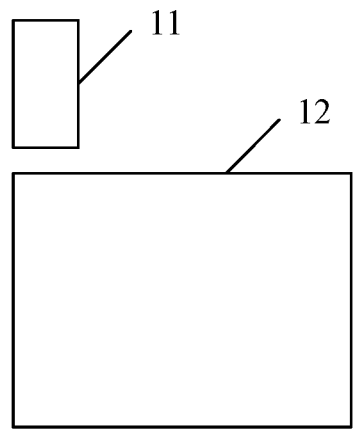
FIG. 3a to FIG. 3c are schematic diagrams of uplink channels with a same transmission start time or different transmission start times provided by some embodiments of the present disclosure.

An example is given that the at least two uplink channels includes a first uplink channel 11 and a second uplink channel 12, and the first uplink channel 11 has the highest priority. A second implementation manner of step 14 may be as follows:

with reference to FIG. 3*a*, in a case that the transmission start time of the first uplink channel 11 is the same as the transmission start time of the second uplink channel 12, the first uplink channel 11 further carries the information carried by the second uplink channel 12. That is, in a case that the transmissions of the first uplink channel 11 and the second uplink channel 12 conflict in the time domain, the information carried on the two uplink channels is multiplexed on the first uplink channel 11 for transmission; or the information carried on the second uplink channel 12 is discarded, and only the information carried on the first uplink channel 11 is transmitted.

Figure 3B:
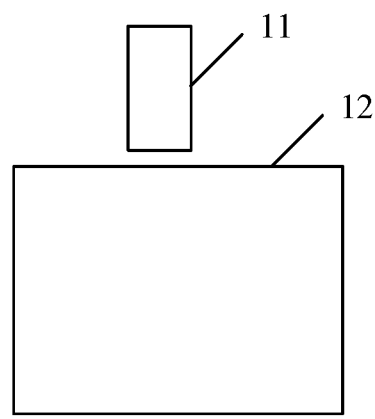

An example is given that the at least two uplink channels includes a first uplink channel 11 and a second uplink channel 12, and the first uplink channel 11 has the highest priority. A third implementation manner of step 14 may be as follows:

with reference to FIG. 3b, in a case that the transmission start time of the first uplink channel 11 is later than the transmission start time of the second uplink channel 12, transmitting the second uplink channel 12 first, and in a case that the transmissions of the first uplink channel 11 and the second uplink channel 12 conflict in the time domain, stopping transmitting the second uplink channel 12 and starting to transmit the first uplink channel 11; and with reference to FIG. 3c, in a case that the transmission start time of the first uplink channel 11 is earlier than the transmission start time of the second uplink channel 12, starting to transmit the first uplink channel 11 and cancelling transmission of the second uplink channel 12.

In view of the forgoing, in a case that transmissions of at least two uplink channels conflict in a time domain, a terminal device in the present disclosure determines priorities of the at least two uplink channels based on at least one of a transmission-related time duration, a transmission start time or carried information; and performs uplink transmission based on the determined priorities, which can avoid a problem of ambiguous behavior of the terminal device in a case that transmissions of at least two uplink channels conflict in a time domain, thereby improving the effectiveness of communications.

On the basis of the foregoing embodiments, the present disclosure further discloses uplink transmission steps corresponding to the at least two uplink channels, which includes a first PUCCH11 and a second PUCCH12.

Figure 3C:
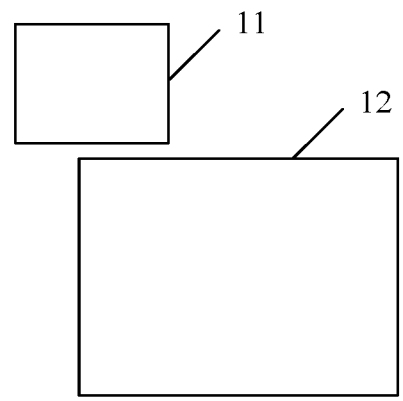

Taking the information carried by the first PUCCH11 as SR and the information carried by the second PUCCH as HARQ-ACK information as an example, it is assumed that a transmission periodicity of SR is configured as X (Orthogonal Frequency Division Multiplexing, OFDM) symbols, and the number of time-domain symbols of the second PUCCH12 is Y Since the SR is configured periodically, in a certain slot, there may be a situation where the transmissions of the second PUCCH12 and the first PUCCH11 conflict in the time domain, for example, three conflict situations as shown in FIG. 3a to FIG. 3c.

In a case that a conflict occurs, the terminal device may determine which PUCCH is to be transmitted and what information is carried on the transmitted PUCCH, based on a transmission periodicity of the SR and a time-domain duration of the second PUCCH12, priorities corresponding to the SR and HARQ-ACK information, and start symbol positions of the first PUCCH11 and the second PUCCH12 (corresponding to the transmission start time as shown in FIG. 1).

The step of determining a priority of a PUCCH may specifically include:

a first step, comparing the transmission periodicity of SR with the time-domain duration of the second PUCCH12; if X<Y, determining that the priority of the first PUCCH11 is higher than the priority of the second PUCCH12; if X>Y, determining that the priority of the first PUCCH11 is lower than the priority of the second PUCCH12; and if X=Y, going to the second step;

a second step, comparing priorities corresponding to the SR and a HARQ-ACK bit; if it is compared that the priority corresponding to the SR is lower than the priority corresponding to the HARQ-ACK information, determining that the priority of the first PUCCH1 is lower than that of the second PUCCH12, based on statements in the section about "priority corresponding to the carried information" in the description of FIG. 1; conversely, if the priority corresponding to the SR is higher than the priority corresponding to the HARQ-ACK information, determining that the priority of the first PUCCH11 is higher than the priority of the second PUCCH12; and if the priority corresponding to the SR is the same as the priority corresponding to the HARQ-ACK information, going to the third step; and a third step, comparing the starting symbol positions of the first PUCCH1 and the second PUCCH12; if the start symbol position of the first PUCCH11 is earlier than the start symbol position of the second PUCCH12, determining that the priority of the first PUCCH12 is higher than the priority of the second PUCCH12, see FIG. 3c; conversely, if the start symbol position of the first PUCCH11 is later than the start symbol position of the second PUCCH12, determining that the priority of the first PUCCH11 is lower than that of the second PUCCH12, see FIG. 3b.

Further, after determining one of the first PUCCH 11 and the second PUCCH 12 to have the higher priority, the terminal device may transmit the PUCCH with the higher priority.

Taking the priority of the first PUCCH1 lower than that of the second PUCCH12 as an example, the method of transmitting the second PUCCH12 includes following steps.

If start symbols of the second PUCCH12 and the first PUCCH11 are the same (see FIG. 3a), the SR may be multiplexed on the second PUCCH12 for transmission together, or the SR may be discarded and the second PUCCH12 carrying HARQ-ACK information may be transmitted.

If a start symbol of the second PUCCH12 is earlier than a start symbol of the first PUCCH11 (see FIG. 3b), the second PUCCH12 starts to be transmitted at the start symbol of the second PUCCH12, and the transmission of the first PUCCH11 is canceled. The cancelling transmission of the first PUCCH11 can be understood as giving up transmission of the first PUCCH11.

If a start symbol of the second PUCCH12 is later than a start symbol of the first PUCCH11 (see FIG. 3c), the transmission of the first PUCCH11 is stopped at a position of the start symbol of the second PUCCH12, and the transmission of the second PUCCH12 is started.

In view of the above, in the present disclosure, in a case that transmissions of the first PUSCH and the second PUSCH conflict in the time domain, priorities of the two PUSCHs are determined based on at least one of a transmission-related time duration, a transmission start time, or carried information, and uplink transmission is performed based on the determined priorities, which can avoid a problem of ambiguous behavior of the terminal device in a case that transmissions of two PUSCHs conflict in the time domain, thereby improving the effectiveness of communications.

On the basis of the foregoing embodiments, the present disclosure further discloses uplink transmission steps corresponding to the at least two uplink channels, which includes the first PUSCH11 and the second PUSCH12.

First of all, it needs to be explained that since the PUSCH may be scheduled by an uplink scheduling grant (UL grant), it may also be semi-persistently configured by a system and may be transmitted multiple times after being triggered by downlink control information (Downlink Control Information, DCI). When a network device is scheduling a PUSCH resource, it may happen that the terminal device has a service with a higher priority and the network device schedules a new PUSCH, which may cause different PUSCHs to overlap or partially overlap in time.

It is assumed that the number of time-domain symbols of the first PUSCH11 is X, and the number of time-domain symbols of the second PUSCH12 is Y. In a case that transmissions of the first PUSCH11 and the second PUSCH12 conflict in the time domain, the terminal device may determine priorities of the first PUSCH11 and the second PUSCH12 based on the respective numbers of time-domain symbols, the carried information, and start symbol positions (corresponding to the transmission start times in FIG. 1) of the first PUSCH11 and the second PUSCH12, which specifically includes:

a first step, comparing the number of time-domain symbols of the first PUSCH11 with the number of time-domain symbols of the second PUSCH12; if X<Y, determining that the priority of the first PUSCH11 is higher than that of the second PUSCH12; if X>Y, determining that the priority of the first PUSCH11 is lower than that of the second PUSCH12; and if X=Y, going to a second step;

the second step, comparing the priority corresponding to the information carried on the first PUSCH11 with the priority corresponding to the information carried on the second PUSCH12; if a type of the information carried on the first PUSCH11 is Data, and a type of the information carried on the second PUSCH12 is UCI, determining that the priority of the first PUSCH11 is higher than that of the second PUSCH12; if types of the information carried on the first PUSCH11 and the second PUSCH12 are both UCI, further determining the priorities of the first PUSCH11 and the second PUSCH12 based on priorities of different UCIs, where for example, a priority of HARQ-ACK/SR is higher than that of CSI, and CSI is divided into aperiodic CSI (Aperiodic CSI, A-CSI), or periodic CSI (Periodic CSI, P-CSI) or semi-persistent CSI (Semi-Persistent CSI, SP-CSI), and priorities of different types of CSI are not limited herein; and if the information carried on the PUSCH11 and the information carried on the second PUSCH 2 are the same (for example, both are Data), or priorities corresponding to the information carried on the first PUSCH11 and the second PUSCH12 are the same, going to a third step; and the third step, comparing the starting symbol positions of the first PUSCH11 and the second PUSCH12; if the start symbol of the first PUSCH11 is earlier than the start symbol of the second PUSCH12, determining that the priority of the first PUSCH11 is higher than that of the second PUSCH12; conversely, if the start symbol of the first PUSCH11 is later than the start symbol of the second PUSCH12, determining that the priority of the first PUSCH11 is lower than that of the second PUSCH12.

Based on the above three steps, after determining the priorities of the first PUSCH11 and the second PUSCH12, the terminal device transmits the PUSCH with a higher priority.

It is assumed that the priority of the first PUSCH11 is higher than that of the second PUSCH12, the method of transmitting the first PUSCH11 includes:

if the start symbol positions of the first PUSCH11 and the second PUSCH12 are the same (see FIG. 3a), multiplexing the information carried on the second PUSCH12 onto the first PUSCH11 for transmission;

if the start symbol of the second PUSCH12 is earlier than the start symbol of the first PUSCH11 (see FIG. 3b), stopping transmitting the second PUSCH12 and starting transmission of the first PUSCH11; and if the start symbol of the second PUSCH12 is later than the start symbol of the first PUSCH11, abandoning transmission of the second PUSCH12, and only transmitting the first PUSCH11.

In view of the above, in the present disclosure, in a case that transmissions of the first PUSCH and the second PUSCH conflict in the time domain, priorities of the two PUSCHs are determined based on at least one of a transmission-related time duration, a transmission start time, or carried information, and uplink transmission is performed based on the determined priorities, which can avoid a problem of ambiguous behavior of the terminal device in a case that transmissions of two PUSCH conflict in the time domain, thereby improving the effectiveness of communications.

On the basis of the above-mentioned embodiments, the present disclosure further discloses uplink transmission steps corresponding to the at least two uplink channels, which includes the first PUSCH11 and the second PUSCH12.

First of all, it needs to be explained that since the PUSCH may be scheduled by UL grant, it may also be semi-persistently configured by a system and may be transmitted multiple times after being triggered by DCI. Since a PUCCH may be semi-persistently configured by the system (used to feed back P-CSI) or dynamically determined by the ACK resource indication (ACK Resource Indication, ARI) (and implicit manner) in downlink (Downlink, DL) DCI, transmission times of PUCCH and PUSCH may conflict in a certain slot.

It is assumed that the number of time-domain symbols of a PUCCH is X, and the number of time-domain symbols of PUSCH is Y. In a case that transmissions of the PUCCH and the PUSCH conflict in the time domain, the terminal device may determine priorities of the PUCCH and the PUSCH based on at least one of the respective numbers of time-domain symbols, the carried information, and start symbol positions of the PUCCH and the PUSCH, and performs uplink transmission based on which one of the PUCCH and the PUSCH has the higher priority.

The foregoing embodiments has described in detail the case where at least two uplink channels include the first PUCCH and the second PUCCH, or the case where the at least two uplink channels include the first PUSCH and the second PUSCH. Thus, the similar part will not be extended and described herein in the present disclosure, which may refer to the above related descriptions.

In view of the forgoing, in the present disclosure, in a case that transmissions of a PUCCH and a PUSCH conflict in the time domain, priorities of the PUCCH and the PUSCH are determined based on at least one of a transmission-related time duration, a transmission start time or carried information; and uplink transmission is performed based on the determined priorities, which can avoid a problem of ambiguous behavior of the terminal device in a case that transmissions of PUCCH and PUSCH conflict in the time domain, thereby improving the effectiveness of communications.

Figure 6:
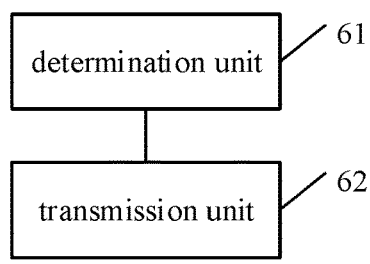
FIG. 6 is a schematic structural diagram of a terminal device provided by some embodiments of the present disclosure.

FIG. 6 is a schematic structural diagram of a terminal device provided by some embodiments of the present disclosure. Referring to FIG. 6, the terminal device may include: a determination unit 61 and a transmission unit 62.

The determination unit 61 is configured to determine, in a case that transmissions of at least two uplink channels conflict in a time domain, priorities of the at least two uplink channels according to at least one of a transmission-related time duration, a transmission start time or carried information.

The transmission unit 62 is configured to perform uplink transmission according to the priorities of the at least two uplink channels.

The transmission-related time duration includes at least one of a time duration occupied by each of the at least two uplink channels, or a transmission periodicity of the carried information on each of the at least two uplink channels.

The determination unit 61 is specifically configured to determine the priorities of the at least two uplink channels according to one of following rules:

an uplink channel with the shorter transmission-related time duration having a higher priority;

among uplink channels with the same transmission-related time duration, an uplink channel whose carried information having a higher priority having a higher priority;

among uplink channels with the same transmission-related time duration, an uplink channel with the earlier transmission start time having a higher priority;

among uplink channels with the same transmission-related time duration and with carried information having a same priority, an uplink channel with the earlier transmission start time having a higher priority; or among uplink channels with the same transmission-related time duration and with the same transmission start time, an uplink channel whose carried information has a higher priority having a higher priority.

Optionally, the determination unit 61 is specifically configured to determine the priorities of the at least two uplink channels according to one of following rules:

an uplink channel whose carried information has a higher priority having a higher priority;

among uplink channels whose carried information has a same priority, an uplink channel with the shorter transmission-related time duration having a higher priority;

among uplink channels whose carried information has a same priority, an uplink channel with the earlier transmission start time having a higher priority; or among uplink channels with the same transmission start time and with carried information having a same priority, an uplink channel with the shorter transmission-related time duration having a higher priority.

Optionally, the determination unit 61 is specifically configured to determine the priorities of the at least two uplink channels according to one of following rules:

an uplink channel with the earlier transmission start time having a higher priority;

among uplink channels with the same transmission start time, an uplink channel with the shorter transmission-related time duration having a higher priority; or among uplink channels with the same transmission start time, an uplink channel whose carried information has a higher priority having a higher priority.

Further, the determination unit 61 is further configured to determine the priority of the carried information on the at least two uplink channels, according to a type of the carried information on the at least two uplink channels.

The transmission unit 62 is specifically configured to transmit a first uplink channel of the at least two uplink channels, wherein a priority of the first uplink channel is higher than priorities of the at least two uplink channels other than the first uplink channel.

A transmission start time of the first uplink channel is later than a transmission start time of a second uplink channel of the at least two uplink channels; and the transmission unit 62 is further configured to stop transmitting the second uplink channel.

A transmission start time of the first uplink channel is earlier than a transmission start time of a second uplink channel of the at least two uplink channels, and the transmission unit 62 is further configured to cancel transmission of the second uplink channel.

A transmission start time of the first uplink channel is the same as a transmission start time of a second uplink channel of the at least two uplink channels, and the first uplink channel further carries the carried information on the second uplink channel.

The at least two uplink channels include a physical uplink control channel (PUCCH) and a physical uplink shared channel (PUSCH); or the at least two uplink channels include a first PUCCH and a second PUCCH; or the at least two uplink channels include a first PUSCH and a second PUSCH.

The terminal device provided by some embodiments of the present disclosure can implement every processes implemented by the terminal device in the method embodiments shown in FIGS. 1-2 and 4-5. To avoid repetition, details are not described herein again.

In some embodiments of the present disclosure, in a case that transmissions of at least two uplink channels conflict in a time domain, a terminal device determines priorities of the at least two uplink channels based on at least one of a transmission-related time duration, a transmission start time or carried information; and performs uplink transmission based on the determined priorities, which can avoid a problem of ambiguous behavior of the terminal device in a case that transmissions of at least two uplink channels conflict in the time domain, thereby improving the effectiveness of communications.

Figure 7:
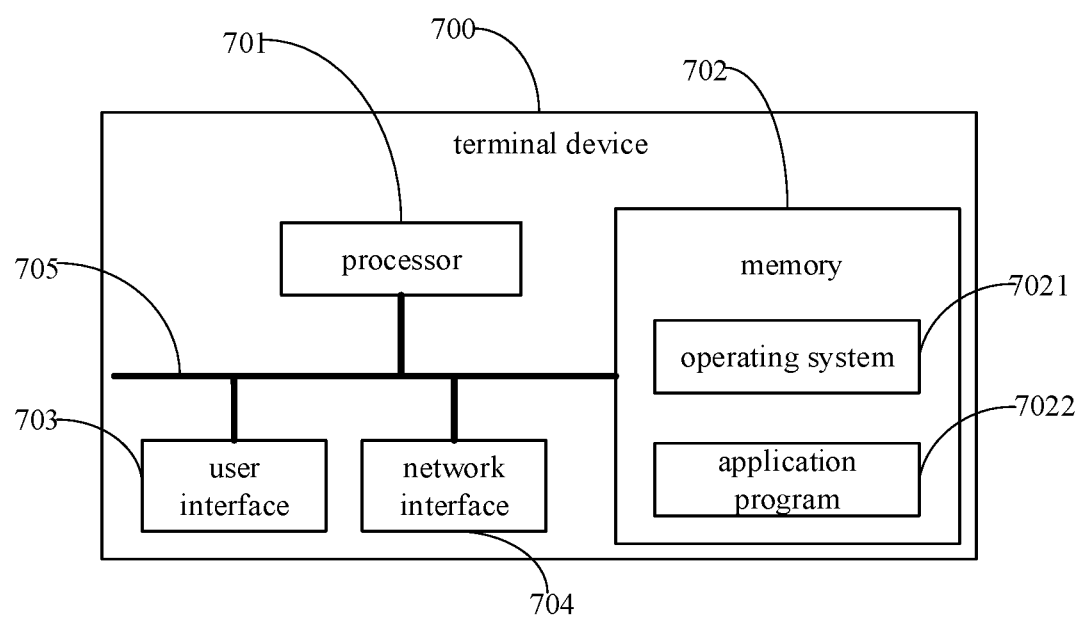
FIG. 7 is a schematic structural diagram of a terminal device provided by some embodiments of the present disclosure.

FIG. 7 is a schematic structural diagram of a terminal device provided by some embodiments of the present disclosure. Referring to FIG. 7, the terminal device 700 includes: at least one processor 701, a memory 702, at least one network interface 704, and a user interface 703. The various components in the terminal device 700 are coupled together through a bus system 705. It can be understood that the bus system 705 is used to implement connection and communication between these components. In addition to the data bus, the bus system 705 includes a power bus, a control bus, and a status signal bus. However, for clarity of description, various buses are marked as the bus system 705 in FIG. 7.

The user interface 703 may include a display, a keyboard, a pointing device (for example, a mouse and a trackball), a touch panel, or a touch screen.

It can be understood that the memory 702 in some embodiments of the present disclosure may be a volatile memory or a non-volatile memory, or may include both the volatile memory and the non-volatile memory. The non-volatile memory may be read-only memory (Read-Only Memory, ROM), programmable read-only memory (Programmable ROM, PROM), erasable programmable read-only memory (Erasable PROM, EPROM), and electrically erasable programmable read-only memory (Electrically EPROM, EEPROM) or flash memory. The volatile memory may be a random access memory (Random Access Memory, RAM), which is used as an external cache. By way of exemplary but not restrictive description, many forms of RAM are available, such as static random access memory (Static RAM, SRAM), dynamic random access memory (Dynamic RAM, DRAM), synchronous dynamic random access memory (Synchronous DRAM, SDRAM), double data rate synchronous dynamic random access memory (Double Data Rate SDRAM, DDRSDRAM), enhanced synchronous dynamic random access memory (Enhanced SDRAM, ESDRAM), synchlink dynamic random access memory (Synchlink DRAM, SLDRAM) and direct Rambus random access memory (Direct Rambus RAM, DRRAM). The memory 702 in the system and the method described in some embodiments of the present disclosure is intended to include, but not limited to, these and any other suitable types of memory.

In some embodiments, the memory 702 stores the following elements, executable modules or data structures, or a subset thereof, or an extended set thereof, which includes an operating system 7021 and an application program 7022.

The operating system 7021 includes various system programs, such as a framework layer, a core library layer, and a driver layer, which are used to implement various basic services and process hardware-based tasks. The application program 7022 includes various application programs, such as a media player (Media Player), a browser (Browser), which are used to implement various application services. A program for implementing the method according to some embodiments of the present disclosure may be included in the application program 7022.

In some embodiments of the present disclosure, the terminal device 700 further includes: a computer program stored in the memory 702 and executable on the processor 701. When the computer program is executed by the processor 701, the processor 701 implements the following steps:

determining, in a case that transmissions of at least two uplink channels conflict in a time domain, priorities of the at least two uplink channels according to at least one of a transmission-related time duration, a transmission start time or carried information; and performing uplink transmission according to the priorities of the at least two uplink channels.

The method disclosed in the above embodiments of the present disclosure may be applied to the processor 701 or implemented by the processor 701. The processor 701 may be an integrated circuit chip with signal processing capability. In the implementation process, various steps of the foregoing method can be completed by a hardware integrated logic circuit in the processor 701 or instructions in the form of software. The aforementioned processor 701 may be a general purpose processor, a digital signal processor (Digital Signal Processor, DSP), an application specific integrated circuit (Application Specific Integrated Circuit, ASIC), a field programmable gate array (Field Programmable Gate Array, FPGA) or other programmable logic devices, discrete gate or transistor logic devices, or discrete hardware components, which can implement or execute methods, steps, and logical block diagrams disclosed in some embodiments of the present disclosure. The general-purpose processor may be a microprocessor or any conventional processor or the like. The steps of the method disclosed in some embodiments of the present disclosure may be directly embodied as being executed and completed by a hardware decoding processor, or executed and completed by a combination of hardware and software modules in the decoding processor. The software modules may be located in a computer-readable storage medium that is mature in the field, such as random access memory, flash memory, read-only memory, programmable read-only memory, electrically erasable programmable memory, or register. The computer-readable storage medium is located in the memory 702, and the processor 701 reads information from the memory 702, and completes the steps of the foregoing method in combination with its hardware. Specifically, a computer program is stored on the computer-readable storage medium, and when the computer program is executed by the processor 701, the processor 701 implements various steps of the foregoing method embodiments.

It can be understood that the embodiments described in some embodiments of the present disclosure may be implemented by hardware, software, firmware, middleware, microcode, or a combination thereof. For hardware implementation, the processing unit can be implemented in one or more of: application specific integrated circuit (Application Specific Integrated Circuit, ASIC), digital signal processing (Digital Signal Processing, DSP), DSP device (DSP Device, DSPD), programmable logic device (Programmable Logic Device, PLD), field programmable gate array (Field Programmable Gate Array, FPGA), general-purpose processor, controller, microcontroller, microprocessor, or other electronic units for performing the functions described in the present disclosure or a combination thereof.

For software implementation, the technology described in some embodiments of the present disclosure can be implemented by executing functional modules (for example, procedures, functions, etc.) described in some embodiments of the present disclosure. The software codes can be stored in the memory and executed by the processor. The memory can be implemented in the processor or external to the processor.

Optionally, the computer program is further executed by the processor 701 to implement the following steps: the transmission-related time duration includes at least one of a time duration occupied by each of the at least two uplink channels, or a transmission periodicity of the carried information on each of the at least two uplink channels.

Optionally, the computer program is further executed by the processor 701 to determine the priorities of the at least two uplink channels according to one of following rules:

an uplink channel with the shorter transmission-related time duration having a higher priority;

among uplink channels with the same transmission-related time duration, an uplink channel whose carried information has a higher priority having a higher priority;

among uplink channels with the same transmission-related time duration, an uplink channel with the earlier transmission start time having a higher priority;

among uplink channels with the same transmission-related time duration wherein priorities corresponding to carried information of the uplink channels are the same, an uplink channel with the earlier transmission start time having a higher priority; or among uplink channels with the same transmission-related time duration and with the same transmission start time, an uplink channel whose carried information has a higher priority having a higher priority.

Optionally, the computer program is further executed by the processor 701 to determine the priorities of the at least two uplink channels according to one of following rules:

an uplink channel whose carried information has a higher priority having a higher priority;

among uplink channels whose carried information has a same priority, an uplink channel with the shorter transmission-related time duration having a higher priority;

among uplink channels whose carried information has a same priority, an uplink channel with the earlier transmission start time having a higher priority; or among uplink channels with the same transmission start time and with carried information having a same priority, an uplink channel with the shorter transmission-related time duration having a higher priority.

Optionally, the computer program is further executed by the processor 701 to determine the priorities of the at least two uplink channels according to one of following rules:

an uplink channel with the earlier transmission start time having a higher priority;

among uplink channels with the same transmission start time, an uplink channel with the shorter transmission-related time duration having a higher priority; or among uplink channels with the same transmission start time, an uplink channel whose carried information has a higher priority having a higher priority.

Optionally, the computer program is further executed by the processor 701 to determine the priority of the carried information on the at least two uplink channels, according to a type of the carried information on the at least two uplink channels.

Optionally, the computer program is further executed by the processor 701 to transmit a first uplink channel of the at least two uplink channels, wherein a priority of the first uplink channel is higher than priorities of the at least two uplink channels other than the first uplink channel.

Optionally, a transmission start time of the first uplink channel is later than a transmission start time of a second uplink channel of the at least two uplink channels; and the computer program is further executed by the processor 701 to stop transmitting the second uplink channel.

Optionally, the computer program is further executed by the processor 701 to cancel transmission of the second uplink channel.

Optionally, a transmission start time of the first uplink channel is the same as a transmission start time of a second uplink channel of the at least two uplink channels, and the first uplink channel further carries the carried information on the second uplink channel.

Optionally, the at least two uplink channels include a physical uplink control channel (PUCCH) and a physical uplink shared channel (PUSCH); or the at least two uplink channels include a first PUCCH and a second PUCCH; or the at least two uplink channels include a first PUSCH and a second PUSCH.

The terminal device 700 can implement every processes implemented by the terminal device in the foregoing embodiments, and to avoid repetition, details are not described herein again. Moreover, in some embodiments of the present disclosure, in a case that transmissions of at least two uplink channels conflict in a time domain, priorities of the at least two uplink channels are determined based on at least one of a transmission-related time duration, a transmission start time or carried information; and uplink transmission is performed based on the determined priorities, which can avoid a problem of ambiguous behavior of the terminal device in a case that transmissions of at least two uplink channels conflict in the time domain, thereby improving the effectiveness of communications.

Optionally, some embodiments of the present disclosure further provide a terminal device, including a processor 701, a memory 702, a computer program stored in the memory 702 and executable on the processor 701. When executing the computer program, the processor 701 is configured to implement each process of the foregoing embodiments about the uplink transmission method, and can achieve the same technical effect. To avoid repetition, details are not described herein again.

Some embodiments of the present disclosure further provide a computer-readable storage medium, on which a computer program is stored. When the computer program is executed by a processor, the processor is configured to implement each process of the foregoing embodiments about the uplink transmission method, and can achieve the same technical effect. To avoid repetition, details are not described herein again. The computer-readable storage medium may be volatile, nonvolatile, or both volatile and nonvolatile, such as read-only memory (Read-Only Memory, ROM), random access memory (Random Access Memory, RAM), magnetic disk or optical disk, etc.

It should be noted that in this specification, terms "include", "comprise" or any other variants thereof are intended to cover non-exclusive inclusion, so that a process, method, article or device including a series of elements not only includes those elements, but also includes other elements not explicitly listed, or elements inherent to the process, method, article, or device. If there are no more restrictions, the element defined by the sentence "including a . . . " does not exclude the existence of other identical elements in the process, method, article or device that includes the element.

Through the description of the above embodiments, those skilled in the art can clearly understand that the method of the above embodiments can be implemented by means of software plus a necessary general hardware platform, or by means of hardware, and in many cases the former is better. Based on such understanding, a part of the technical solutions of the present disclosure that is essential or contributes to the related technology can be embodied in a form of a software product. The computer software product is stored in a storage medium (such as ROM/RAM, magnetic disk, optical disk), and includes several instructions to make a terminal (which may be a mobile phone, a computer, a server, an air conditioner, or a network device, etc.) execute the methods described in the various embodiments of the present disclosure.

The embodiments of the present disclosure are described above with reference to the accompanying drawings, but the present disclosure is not limited to the above-mentioned specific embodiments. The above-mentioned specific embodiments are only illustrative and not restrictive. Those of ordinary skill in the art are can make many forms with the teaching of the present disclosure and without departing from the principle of the present disclosure and the protection scope of claims, which shall fall within the protection scope of the present disclosure.

What is claimed is:

1. An uplink transmission method, comprising:
   determining, in a case that transmissions of at least two uplink channels conflict in a time domain, priorities of the at least two uplink channels according to transmission start times and carried information of the at least two uplink channels; and
   performing uplink transmission according to the priorities of the at least two uplink channels,
   wherein the determining the priorities of the at least two uplink channels comprises:
   determining the priorities of the at least two uplink channels according to one of following rules:
   among uplink channels whose carried information have a same priority, an uplink channel with the earlier transmission start time having a higher priority;

among uplink channels with a same transmission-related time duration, an uplink channel with the earlier transmission start time having a higher priority;
among uplink channels with a same transmission-related time duration and with carried information having a same priority, an uplink channel with the earlier transmission start time having a higher priority;
an uplink channel with the earlier transmission start time having a higher priority;
among uplink channels with a same transmission-related time duration and with the same transmission start time, an uplink channel whose carried information has a higher priority having a higher priority;
among uplink channels with the same transmission start time, an uplink channel whose carried information has a higher priority having a higher priority.

2. The method according to claim 1, wherein the determining the priorities of the at least two uplink channels further comprises: determining the priorities of the at least two uplink channels according to a transmission-related time duration of each of the at least two uplink channels, and the transmission-related time duration comprises at least one of a time duration occupied by each of the at least two uplink channels, or a transmission periodicity of information carried on each of the at least two uplink channels.

3. The method according to claim 2, wherein the determining the priorities of the at least two uplink channels further comprises determining the priorities of the at least two uplink channels according to one of following rules:
an uplink channel with the shorter transmission-related time duration having a higher priority;
among uplink channels with the same transmission-related time duration, an uplink channel whose carried information has a higher priority having a higher priority.

4. The method according to claim 2, wherein the determining the priorities of the at least two uplink channels further comprises determining the priorities of the at least two uplink channels according to one of following rules:
an uplink channel whose carried information has a higher priority having a higher priority;
among uplink channels whose carried information has a same priority, an uplink channel with the shorter transmission-related time duration having a higher priority;
among uplink channels with the same transmission start time and with carried information having a same priority, an uplink channel with the shorter transmission-related time duration having a higher priority.

5. The method according to claim 1, wherein the determining the priorities of the at least two uplink channels further comprises determining the priorities of the at least two uplink channels according to the following rule:
among uplink channels with the same transmission start time, an uplink channel with the shorter transmission-related time duration having a higher priority.

6. The method according to claim 4, further comprising:
determining a priority of the carried information on the at least two uplink channels, according to a type of the carried information on the at least two uplink channels.

7. The method according to claim 1, wherein the performing uplink transmission according to the priorities of the at least two uplink channels comprises:
transmitting a first uplink channel of the at least two uplink channels, wherein a priority of the first uplink channel is higher than priorities of the at least two uplink channels other than the first uplink channel.

8. The method according to claim 7, wherein a transmission start time of the first uplink channel is later than a transmission start time of a second uplink channel of the at least two uplink channels; and
the performing uplink transmission according to the priorities of the at least two uplink channels further comprises: stopping transmitting the second uplink channel.

9. The method according to claim 7, wherein a transmission start time of the first uplink channel is earlier than a transmission start time of a second uplink channel of the at least two uplink channels, and the method further comprises:
cancelling transmission of the second uplink channel.

10. The method according to claim 7, wherein a transmission start time of the first uplink channel is the same as a transmission start time of a second uplink channel of the at least two uplink channels, and the first uplink channel further carries information carried on the second uplink channel.

11. The method according to claim 1, wherein the at least two uplink channels comprise a physical uplink control channel (PUCCH) and a physical uplink shared channel (PUSCH); or
the at least two uplink channels comprise a first PUCCH and a second PUCCH; or
the at least two uplink channels comprise a first PUSCH and a second PUSCH.

12. A terminal device, comprising: a memory, a processor, and a computer program that is stored on the memory and executable on the processor, wherein when executing the computer program, the processor is configured to:
determine, in a case that transmissions of at least two uplink channels conflict in a time domain, priorities of the at least two uplink channels according to transmission start times and carried information of the at least two uplink channels; and
perform uplink transmission according to the priorities of the at least two uplink channels,
wherein the determining the priorities of the at least two uplink channels comprises:
determining the priorities of the at least two uplink channels according to one of following rules:
among uplink channels whose carried information have a same priority, an uplink channel with the earlier transmission start time having a higher priority;
among uplink channels with a same transmission-related time duration, an uplink channel with the earlier transmission start time having a higher priority;
among uplink channels with a same transmission-related time duration and with carried information having a same priority, an uplink channel with the earlier transmission start time having a higher priority;
an uplink channel with the earlier transmission start time having a higher priority;
among uplink channels with a same transmission-related time duration and with the same transmission start time, an uplink channel whose carried information has a higher priority having a higher priority;
among uplink channels with the same transmission start time, an uplink channel whose carried information has a higher priority having a higher priority.

13. The terminal device according to claim 12, wherein the processor is further configured to determine the priorities of the at least two uplink channels according to a transmission-related time duration of each of the at least two uplink channels, and the transmission-related time duration comprises at least one of a time duration occupied by each of the at least two uplink channels, or a transmission periodicity of information carried on each of the at least two uplink channels.

14. The terminal device according to claim 13, wherein the processor is further configured to determine the priorities of the at least two uplink channels according to one of following rules:
an uplink channel with the shorter transmission-related time duration having a higher priority;
among uplink channels with the same transmission-related time duration, an uplink channel whose carried information has a higher priority having a higher priority.

15. The terminal device according to claim 13, wherein the processor is further configured to determine the priorities of the at least two uplink channels according to one of following rules:
an uplink channel whose carried information has a higher priority having a higher priority;
among uplink channels whose carried information has a same priority, an uplink channel with the shorter transmission-related time duration having a higher priority;
among uplink channels with the same transmission start time and with carried information having a same priority, an uplink channel with the shorter transmission-related time duration having a higher priority,
among uplink channels with the same transmission start time, an uplink channel with the shorter transmission-related time duration having a higher priority.

16. The terminal device according to claim 15, wherein the processor is further configured to determine a priority of the carried information on the at least two uplink channels, according to a type of the carried information on the at least two uplink channels.

17. The terminal device according to claim 12, wherein the processor is further configured to transmit a first uplink channel of the at least two uplink channels, and a priority of the first uplink channel is higher than priorities of the at least two uplink channels other than the first uplink channel.

18. The terminal device according to claim 17, wherein a transmission start time of the first uplink channel is later than a transmission start time of a second uplink channel of the at least two uplink channels; and
the processor is further configured to stop transmitting the second uplink channel, or
wherein a transmission start time of the first uplink channel is earlier than a transmission start time of a second uplink channel of the at least two uplink channels, and the processor is further configured to cancel transmission of the second uplink channel, or
wherein a transmission start time of the first uplink channel is the same as a transmission start time of a second uplink channel of the at least two uplink channels, and the first uplink channel further carries information carried on the second uplink channel.

19. The terminal device according to claim 12, wherein the at least two uplink channels comprise a physical uplink control channel (PUCCH) and a physical uplink shared channel (PUSCH); or
the at least two uplink channels comprise a first PUCCH and a second PUCCH; or
the at least two uplink channels comprise a first PUSCH and a second PUSCH.

20. A non-transitory computer-readable storage medium, wherein a computer program is stored on the computer-readable storage medium, and the computer program is executed by a processor to:
determine, in a case that transmissions of at least two uplink channels conflict in a time domain, priorities of the at least two uplink channels according to transmission start times and carried information of the at least two uplink channels; and
perform uplink transmission according to the priorities of the at least two uplink channels,
wherein the determining the priorities of the at least two uplink channels comprises:
determining the priorities of the at least two uplink channels according to one of following rules:
among uplink channels whose carried information have a same priority, an uplink channel with the earlier transmission start time having a higher priority;
among uplink channels with a same transmission-related time duration, an uplink channel with the earlier transmission start time having a higher priority;
among uplink channels with a same transmission-related time duration and with carried information having a same priority, an uplink channel with the earlier transmission start time having a higher priority;
an uplink channel with the earlier transmission start time having a higher priority;
among uplink channels with a same transmission-related time duration and with the same transmission start time, an uplink channel whose carried information has a higher priority having a higher priority;
among uplink channels with the same transmission start time, an uplink channel whose carried information has a higher priority having a higher priority.

* * * * *